Figure 1:
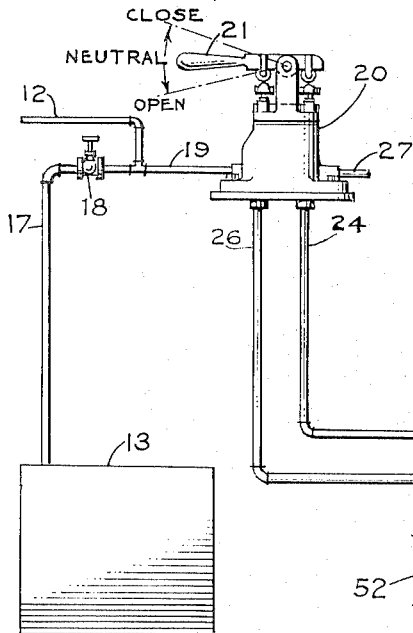

May 1, 1956 S. P. JOHNSON 2,743,705
FLUID REGULATOR FOR A POWER-DRIVEN REMOTELY-CONTROLLED VALVE
Filed Oct. 10, 1952 2 Sheets-Sheet 1

INVENTOR
SIDNEY P. JOHNSON
BY George Lipkin
ATTORNEYS

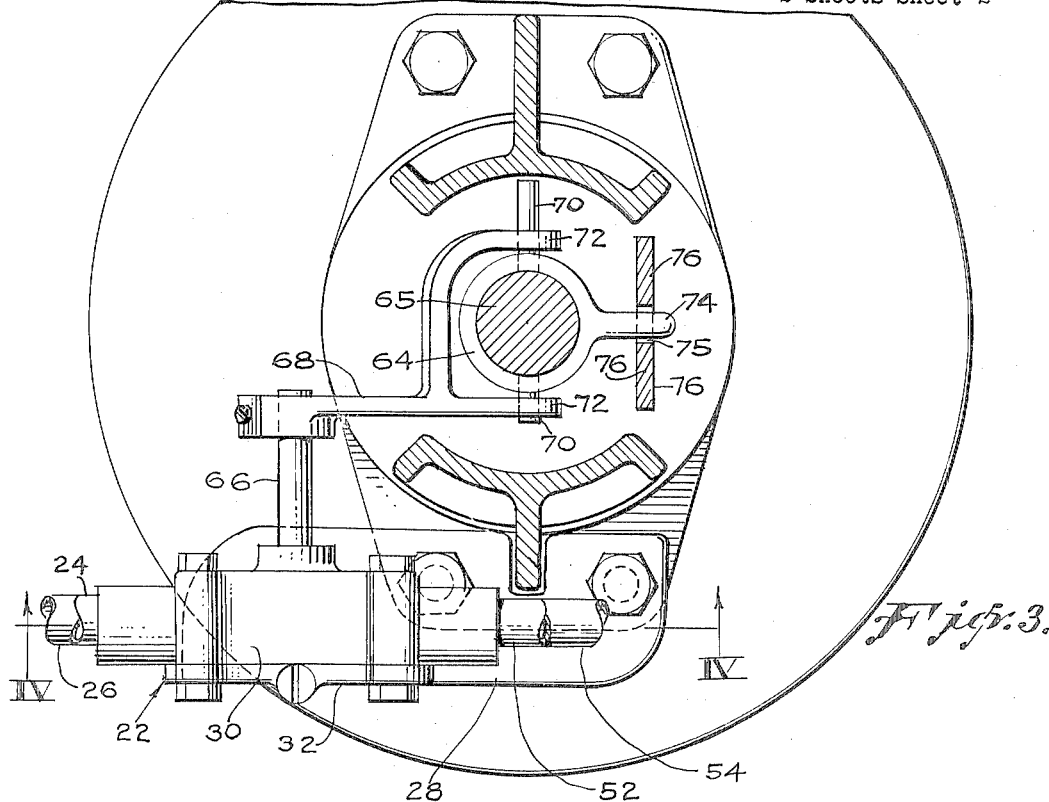
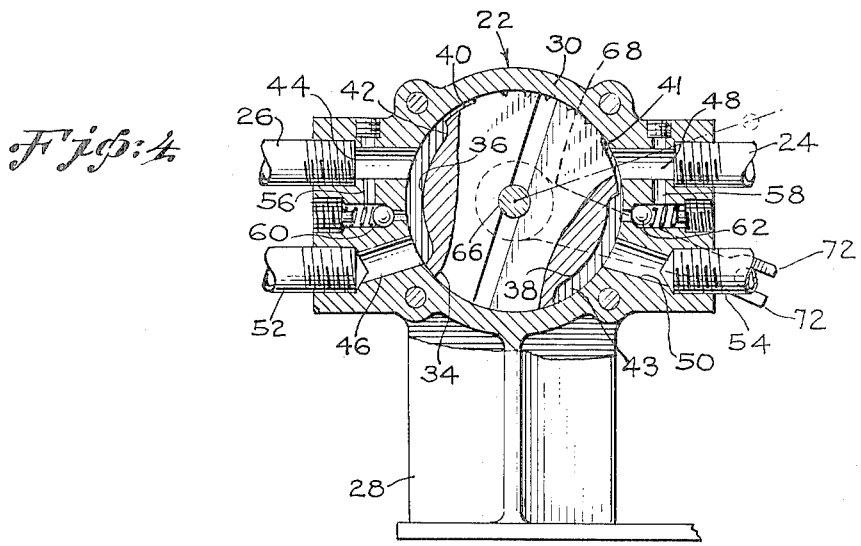

United States Patent Office 2,743,705
Patented May 1, 1956

2,743,705

FLUID REGULATOR FOR A POWER-DRIVEN REMOTELY-CONTROLLED VALVE

Sidney P. Johnson, Washington, D. C.

Application October 10, 1952, Serial No. 314,235

3 Claims. (Cl. 121—39)

(Granted under Title 35, U. S. Code (1952), sec. 266)

This invention relates to fluid control systems and more specifically to a regulator for controlling the operating cycle of a power-driven valve.

This invention may be manufactured and used by or for the Government of the United States of America for governmental purposes without the payment of any royalties thereon or therefor.

One type of machine that may be controlled by the regulator of this invention is a pneumatically-driven, remotely controlled, hydraulic gate valve that is used in fire main and main drain systems on board naval vessels. When the gate valve is closed or opened under full power conditions of the pneumatic motor, the gate is wedged so tightly in the valve body seats that the pneumatic motor is unable to break the gate from its seated position to start the closing or opening stroke. The use of larger pneumatic motors to obtain the required power to break the gate does not solve the problem as the increased momentum due to the increased weight of the moving parts causes a corresponding increase in the wedging force of the gate in seating. Accordingly, it is recognized that the force of the valve gate when contacting the seat at the end of a stroke must be reduced and, to accomplish this result, an operator frequently is stationed at each main gate valve to reduce by hand throttling means the speed and the consequent seating force of the valve gate. This practice obviously is uneconomical and also it is inaccurate as it depends on human judgment for timing under variable operating conditions which are difficult to estimate.

Accordingly, a principal object of this invention is to provide a fluid regulator that will automatically control the movement of a power-driven valve at a predetermined point during its operation.

A further object of this invention is to provide a fluid regulator that will automatically reduce the speed of such a valve in response to a predetermined operating position in the travel of the machine.

Other objects of this invention are to provide a regulator for a fluid control system that will reduce the seating force of a power-driven gate valve at the end of a stroke preventing the valve gate from being jammed in its seat; to provide a single fluid regulator that will control both the opening and closing stroke of the gate valve; to provide a fluid regulator that will permit full flow conditions at the start of a closing or opening stroke of a valve; and to provide a regulator which provides a more accurate control and which is simple in operation, and inexpensive to manufacture.

Further objects will be apparent from the drawings and the following detailed description.

The objects of the invention are accomplished by coupling the regulator to the power-driven valve, this coupling being so arranged that the regulator is moved into a desired throttling position after the valve gate has traveled a predetermined amount. As will be surmised, the regulator, preferably, is specially shaped to impose a restriction in the power line from the control valve when the regulator has been moved a set distance by its coupling with the moving gate and, most suitably, the functional element of the regulator is a rotatable disc provided with a peripheral recess that has a reduced section adapted to perform the throttling action. In operation, movement of the gate normally is under such full power as is permitted by flow through the enlarged section of the recess. As the gate moves the regulator disc rotates and, when the gate has reached a point near its seat, the disc has been rotated to a position at which its restricted section throttles flow and, consequenly, reduces the power supply that moves the gate. The net result is that the seating of the gate is accomplished in a gentler manner designed to avoid "sticking," although, of course, the seating force must be sufficient to ensure a firm, sealing engagement. The regulator also is used to direct reverse flow from the control valve to the prime mover of the gate to reverse its speed, and, therefore, the throttling action is possible for either a closing or opening stroke of the gate.

Figure 2:
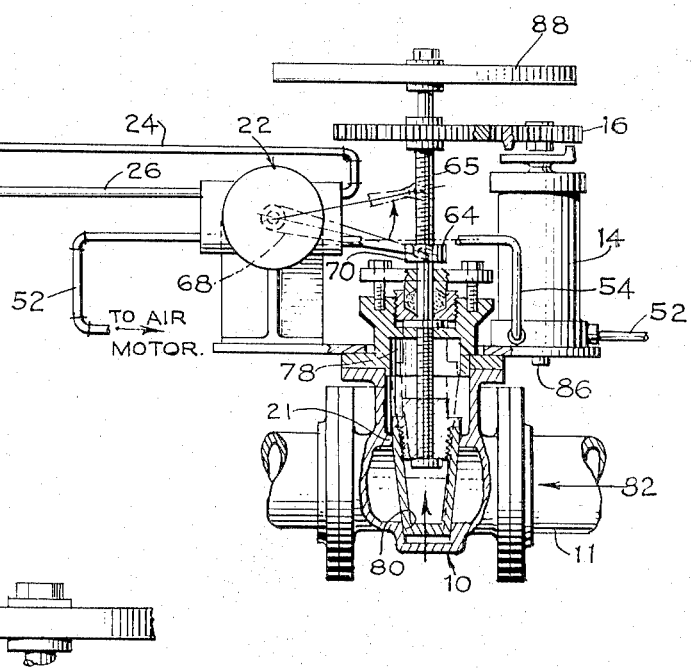
Figure 2:
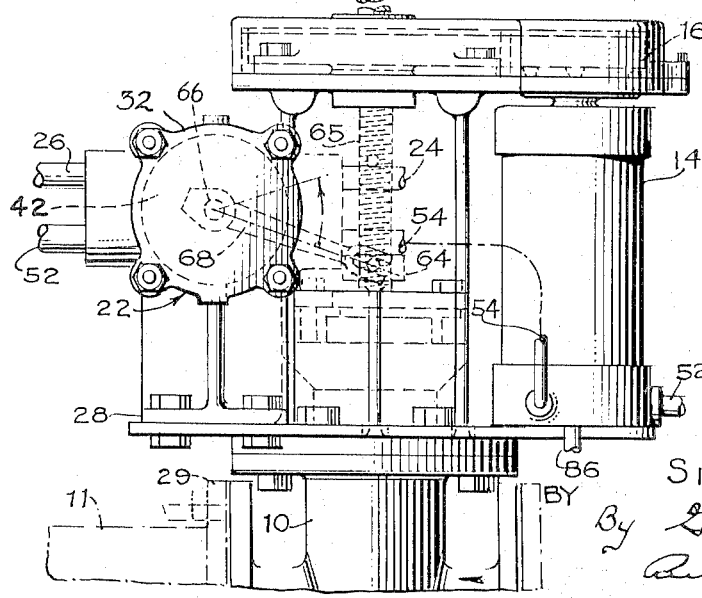

Other features and refinements of the invention will be apparent from the following descriptions and accompanying drawings of which Fig. 1 is a somewhat diagrammatic illustration of the regulator of the invention incorporating a fluid system; Fig. 2 an enlarged side elevation of the regulator and its actuating linkage; Fig. 3 a partial enlarged plan view of mechanism shown in Fig. 2; and Fig. 4 a section taken along line IV—IV of Fig. 3.

Referring to Fig. 1, a pneumatically operated remote control system is illustrated for closing and opening a conventional gate valve 10 which may be used in various installations, such, for instance, as for the control of shipboard fire mains, main drains, etc., represented by numeral 11. Pneumatic pressure is used in the system and this may be supplied either by the ship's air supply line 12 or from an air pressure bottle, such as bottle 13, usually charged at 3000 p. s. i. The air used to reciprocate valve 10 is converted into a mechanical drive by an air motor 14 coupled to the valve through reduction gears 16. The air in line 17 from air bottle 13 is decreased to an operating pressure at 100 p. s. i. by reducing valve 18 connected by line 19 to a control valve 20 which usually is located at a remote station. The control valve is of a standard manufacture known as a Ross control valve and is provided with a handle 21 with three manually settable control positions signifying the desired valve movement, namely, "Close," "Neutral" and "Open." In "Close" and "Open" position control valve 20 admits operating fluid pressure flow to a regulator 22 alternately through one of lines 24 and 26, and exhausts the return flow through the remaining line to atmosphere at vent 27, while in the "Neutral" position the operating pressure in line 19 is blocked from both lines 24 and 26.

The primary function of regulator 22, which forms the principal feature of this invention, is to throtte automatically the flow of air to the air motor 14 near the end of the closing and opening stroke of the valve gate, decelerating the air motor and reducing the force at which the gate valve is seated, thereby preventing the gate from being jammed. As shown in Figs. 2 and 3, the regulator is mounted by bracket 28 to the bonnet flange 29 of gate valve 10 and comprises a cup-shaped regulator body 30 having a cover plate 32 bolted to one side forming an enclosure for a disc valve 34 (Fig. 4) adapted to be rotated by associated linkage or coupling with the gate valve as will be later described.

Generally the coupling is so arranged that reciprocations of the gate valve effected by motor 14 are translated into rotary movements of the disc and the disc is so shaped that these rotary movements either restrict or permit free flow of air to the motor so as to vary the speed or drive of the valve gate during its closing or opening travel. Thus, as may be seen in Fig. 4, the periphery of disc valve 34 is formed with elongate arcuate recesses 36 and 38 symmetrically positioned one on each side of the vertical centerline of the valve, recesses 36 and 38 representing the "Open" side and "Close" side, respectively, of the regulator with respect to direction of valve gate travel. The recesses have corresponding shallow portions 40 and 41 which represent reduced or low speed sections and corresponding deep portions 42 and 43 which represent full speed sections. The depth of the shallow recess will depend on the desired deceleration of the air motor, and the length of the shallow recess will determine at what point in the gate valve travel the air motor is to be decelerated. The speed of the air motor will, of course, control the closing and opening force of the gate valve, and the coupling between the valve gate and the regulator will position the regulator to throttle the air motor at the predetermined point in the valve gate travel. To obtain the desired opening and closing characteristics of a standard 10", 150 p. s. i. gate valve, it has been found satisfactory, in practice, to construct regulator 22 to admit full air flow to the air motor during approximately 85 percent of the gate stroke, and a throttled air flow during the last 15 percent of the stroke. Satisfactory operation has been obtained with dimensions of the disc valve recesses varying for the shallow recess from a depth of 0.0015" on the "Open" side of the regulator to a depth of 0.028" on the "Close" side. Deeper portions 42 and 43 may be of a depth of 0.25". A steady high and low motor speed may be obtained by constructing each deep and shallow portion to substantially a uniform depth, although the depth of each recess may vary if a variable speed is desired.

The regulator body is provided with two opposite pairs of upper and lower ports, 44, 46 and 48, 50, ports 44 and 46 being located on the left and "Open" stroke side of the regulator body in communication with recess 36 to direct air pressure to the motor to open the gate valve. Conversely, ports 48 and 50 are located on the right and "Close" stroke side of the regulator body in communication with recess 38 to direct the air pressure to the motor to close the gate valve. Upper ports 44 and 48 connect control valve 20 by lines 26 and 24, respectively, to either the shallow or deep recesses of the valve disc depending on the position of the valve disc, whereas, ports 46 and 50 connect the air motor 14 via lines 52 and 54, respectively, to the deep recesses only of the valve disc recesses. Each pair of ports 44, 46 and 48, 50 alternately function as the pressure and exhaust side of the system, in accordance with the position control valve 20, for example, with the control valve in "Open" position, and gate valve 10 closed, high pressure air in line 26 is directed to port 44 through recess 36 and port 46 to the air motor, and the return air flow from the air motor is exhausted to the control valve through port 50, recess 38 and port 48 into line 24. When the control valve is thrown to "Close" position the air flow is reversed and high pressure air is directed through line 24 to the air motor through ports 48 and 50 and recess 38, while return flow is passed through ports 46 and 44 and recess 36 into line 26.

After the disc valve completes a closing or opening stroke and comes to rest, the shallow recess on the pressure side, which has functioned to restrict the air pressure flow to decelerate the motor, remains in a throttling position at the commencement of the next stroke when the air flow is reversed and the pressure side of the regulator valve becomes the exhaust side. To avoid a high back pressure in the exhaust line from the air motor at the start of the next stroke, additional passages 56 and 58 are formed in each side of the regulator body and connect the deep recesses of disc valve 34 to the upper ports 44 and 48, respectively. Such high back pressure would reduce the speed of the next stroke and in doing so, would be most undesirable. Spring loaded ball check valves 60 and 62, positioned in passages 56 and 58, are lifted by the return flow to by-pass the excess exhaust air from the air motor which otherwise would be throttled by the shallow recesses. It is apparent that this by-passing flow occurs only on the exhaust side of the regulator at the start of each stroke, and continues until the deep recess on the exhaust side has moved to a position connecting the upper and lower ports and permitting unrestricted exhaust flow.

Disc valve 34 is rotated a predetermined angle from each side of its vertical position, to regulate the flow of operating air pressure, and exhaust, by a coupling from gate valve 10. The coupling (Figs. 2 and 3) comprises linkage connected at one end to a valve gate indicator nut 64, threadedly mounted to gate valve stem 65, and actuates a disc shaft 66 through a yoke arm 68 which straddles the indicator nut and is guided by pins 70 on the indicator nut engaging yoke fingers 72. Rotation of gate valve stem 65 by the air motor through reduction gearing 16 causes indicator nut 64 to ride up and down on the valve stem in a reciprocating movement which is translated by the linkage to a semi-rotary movement of valve disc 34. The indicator nut is restricted from rotary movement on stem 65 by an integral tongue 74, shown in Fig. 3, extending through a slot 75 in indicator plate 76 which normally indicates the position of gate 21 with respect to the upper and lower gate seats 78 and 80, respectively. The fixed angle through which the disc valve rotates is determined by the travel of the indicator nut and the length of yoke arm 68. Thus, by coupling disc valve 34 by its associated linkage to indicator nut 64 on the gate valve stem a servo mechanical response is obtained that will control the admission of operating pressure to the air motor in accordance to the movement of the gate valve in a manner to be presently described.

The system shown in Figs. 1 and 4 is in "Neutral" condition, gate valve 10 is closed stopping the flow of fluid 82 passing through main line 11, the air supply in line 19 is blocked at control valve 20, and disc valve 34 is in a clockwise rotated position from its intermediate position having completed the "Close" stroke by porting operating air pressure line 24 to the air motor to close the gate valve. To open the gate valve, the operator moves the control valve handle to "Open" position arranging the control valve to direct the operating air pressure through line 26 into the regulator valve at port 44, passing through deep recess 42, port 46 and into line 52 to drive the air motor, which, in turn, starts the rotation of gate valve stem 65 through reduction gearing 16 and initiates the opening of gate valve at full speed. The motor return flow in line 54 enters the regulator body at port 50 and is ported around through the deep recess 43, shallow recess 41 where the return flow is throttled to port 48, line 24 and exhausted to the atmosphere at vent 27 in the control valve. As the shallow recess cannot pass all of the return flow, a back pressure is created which lifts check valve 62 by-passing the major portion of the return flow through passage 58 into port 48 where it follows the same path as the throttled flow through shallow recess 41. Check valve 62 remains lifted to dissipate the back pressure of the return flow until disc valve 34 has been rotated counter-clockwise to a position where deep recess 43 directly connects the return air flow in port 50 to port 48. This counter-clockwise movement of the disc valve is accomplished by the opening stroke of the gate valve providing a mechanical response through the rotation of stem 65 which causes indicator unit 64 to ride up the valve stem and pivot yoke arm 68 attached to disc valve shaft 66 in a counter-clockwise direction. The air motor continues to rotate at full speed for the substantial part of the opening stroke until valve gate 21 arrives at a point approximately the last 15 percent of its stroke and the disc valve has been shifted by the response linkage to a position where shallow recess 40 is now aligned with port 44. Consequently, the operating air flow in supply line 26 and port 44 is now throttled by shallow recess 40 reducing the speed of the air motor and the force of gate 21 in engaging its upper seat 78 and the gate is seated without jamming. To return the system to a static or standby condition, the control valve handle is shifted to "Neutral," blocking the operating air pressure to the motor. During the period between the end of the opening stroke and the return of the control valve to "Neutral," any excess air pressure built up in the stopped air motor may be vented by a check valve in an air motor exhaust port 86.

The closing operation of gate valve 10 is similar to the opening operation described above with the pressure and exhaust sides of the system reversed. The gate valve is closed by shifting the control valve handle to the "Close" position which directs the operating air pressure to line 24, port 48, through deep recess 43, port 50 and in line 54 to drive the air motor and valve stem 65 in an opposite direction than the opening stroke, moving indicator nut 64 downward and rotating disc valve 34 in a clockwise direction. To permit full acceleration of the air motor, at the start of the closing stroke, ball check valve 60 in passage 56 lifts to by-pass the major portion of air motor return flow in line 52 until deep segment 42 is aligned with ports 44 and 46. The air motor continues at full speed operation until the valve gate has traveled to within 15 percent of the end of its travel toward its lower seat 80 and disc valve 34 has been rotated by the response linkage to align shallow recess 41 with port 48 to throttle the pressure flow from line 24 and reduce air motor speed. The valve gate engages lower seat 80 at a slower speed and with a reduced force insuring a fluid tight connection across line 11 without jamming the seat which would prevent the start of the opening stroke.

In the event of air pressure failure or a breakdown in the control system, gate valve 10 may be manually opened or closed by a conventional handwheel 88 mounted on the upper end of gate stem 65.

By the foregoing invention, a control system is provided for a prime mover that will automatically control the speed of a driven machine at any predetermined point in its operation. This control system is particularly suitable with remotely controlled, pneumatically driven gate valves for reducing the force of the valve at the end of the opening or closing stroke, whereby the valve gate may be tightly seated without jamming which would otherwise prevent the start of the next stroke. This result is achieved automatically by coupling the novel regulator to the gate valve through response linkage which adjusts the position of the regulator and the speed of the air motor according to the position of the gate in its travel. The regulator is provided with a deep recess that allows the full flow of operating air pressure to drive the motor at full speed, and a shallow recess that restricts the full flow of air to the motor causing a corresponding deceleration of the motor. When the regulator is used with gate valves, the shallow recess is designed to admit restricted operating air flow to the motor until the end of the closing stroke, insuring that the valve gate is seated with sufficient force to form a sealed connection, which might not occur if the air supply was completely blocked to stop the motor. The depth of the recesses may be varied depending on the desired full and reduced motor speeds; and the length of the recesses varied depending on when in the gate valve travel a change of speed is desired. The regulator may be constructed as a one-way valve to control the speed of the air motor and gate valve in only one direction of travel, or as a two-way valve, as illustrated, to control both directions of travel, and in the latter construction the regulator is provided with a pressure side and an exhaust side depending on the direction of air flow which is reversed for each successive stroke of the gate valve. The regulator valve is illustrated as a rotary valve although it is obvious that a straight reciprocating valve may also be suitable to accomplish the same results.

Obviously many modifications and variations of the present invention are possible in the light of the above teachings. It is, therefore, to be understood that within the scope of the appended claims the invention may be practiced otherwise than as specifically described.

I claim:

1. A fluid pressure apparatus for reciprocating a driven member, said apparatus comprising a source of fluid pressure, a fluid pressure motor, a circuit communicating said source with said motor, a valve for reversing the flow through said circuit, and fluid pressure control means disposed in said circuit, said control means including a valve casing, a disc valve rotatably mounted in said casing, and linkage drivably connecting said disc with said driven member, said linkage being adapted to progressively rotate said disc in opposite directions and in amounts proportionately responsive to successive reciprocations of said driven member, said disc being peripherially provided with a separated pair of annular recesses and said casing being provided with a pair of ports communicating each recess with both said supply and said motor, whereby each recess forms a passageway for communicating said motor and said source, said flow through the passageways being reversible in response to said reversing valve, one of said passageways being formed with a reduced section adapted upon disc rotation to throttle its supply port for automatically reducing the advance rate of said driven member, and the other passageway being formed for venting full flow from the motor when the supply port of the first passageway is so throttled.

2. A fluid pressure apparatus for reciprocating a driven member, said apparatus comprising a source of fluid pressure, a fluid pressure motor, a circuit communicating said source with said motor, a valve for reversing the flow through said circuit, and fluid pressure control means disposed in said circuit, said control means including a valve casing, a disc valve rotatably mounted in said casing, and linkage drivably connecting said disc with said driven member, said linkage being adapted to progressively rotate said disc in opposite directions and in amounts proportionately responsive to successive reciprocations of said driven member, said disc being peripherially provided with a separated pair of annular recesses and said casing being provided with a pair of ports communicating each recess with both said supply and said motor, whereby each recess forms a passageway for communicating said motor and said source, said flow through the passageways being reversible in response to said reversing valve, and each of said passageways being formed with a reduced section adapted upon disc rotation to throttle its supply port for automatically reducing the advance rate of said driven member, said reduced section being disposed for permitting full flow from the motor into one of said passageways when the supply port of the other passageway is so throttled.

3. Apparatus according to claim 2 including venting means adapted to open during the initiation of each reciprocation for by-passing back-pressure produced by said throttling action.

References Cited in the file of this patent

UNITED STATES PATENTS

| | | |
|---|---|---|
| 214,461 | Shriver | Apr. 15, 1879 |
| 917,642 | McElroy | Apr. 6, 1909 |
| 1,540,870 | Adams | June 9, 1925 |
| 1,886,518 | Beckwith | Nov. 8, 1932 |
| 2,061,716 | Pratt | Nov. 24, 1936 |
| 2,064,051 | Allard | Dec. 15, 1936 |
| 2,133,580 | Searle | Oct. 18, 1938 |
| 2,164,876 | Horlacher | July 4, 1939 |
| 2,189,823 | Vickers | Feb. 13, 1940 |
| 2,352,140 | Trott | June 20, 1944 |
| 2,432,088 | Caldwell | Dec. 9, 1947 |